Aug. 13, 1929.          S. BALLANTINE          1,724,819
METHOD OF AND MEANS FOR REDUCING RETROACTIVE
CURRENTS IN AUDION AMPLIFIERS
Filed June 2, 1925
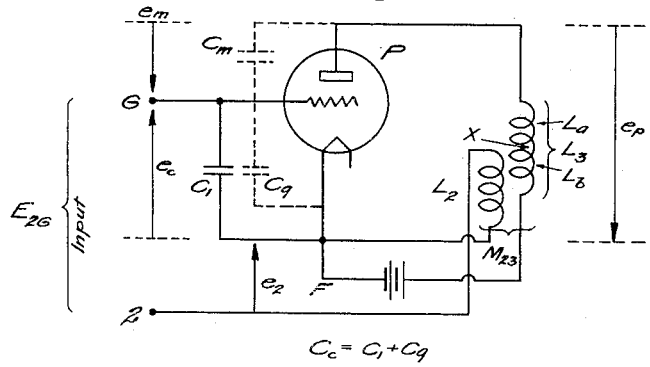
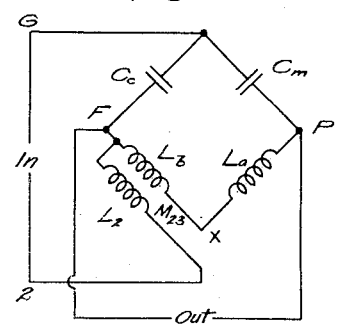
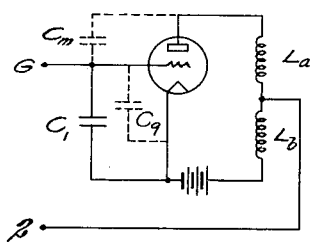
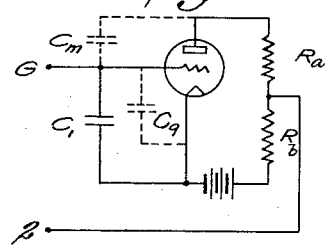
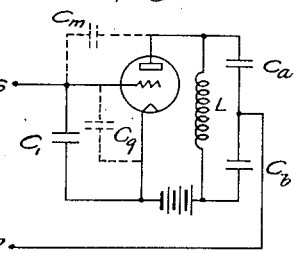
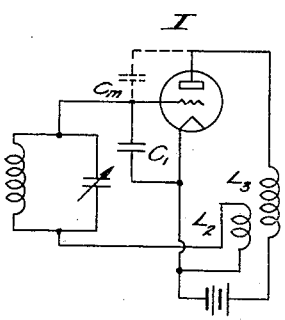
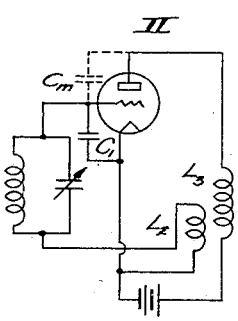
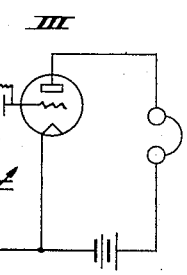
Inventor:
Stuart Ballantine
By Byrnes, Townsend & Brickenstein
Attorneys Patented Aug. 13, 1929.

1,724,819

UNITED STATES PATENT OFFICE.

STUART BALLANTINE, OF WHITE HAVEN, PENNSYLVANIA, ASSIGNOR TO RADIO FREQUENCY LABORATORIES, INCORPORATED, OF BOONTON, NEW JERSEY, A CORPORATION OF NEW JERSEY.

METHOD OF AND MEANS FOR REDUCING RETROACTIVE CURRENTS IN AUDION AMPLIFIERS.

Application filed June 2, 1925. Serial No. 34,388.

This application is a continuation in part of my application, Ser. No. 629,702, filed April 3, 1923. My present invention relates to circuits for thermionic amplifiers, and particularly to a circuit and method for compensating such an amplifier, or a cascaded series of such amplifiers, for retroactive currents which flow through the grid-plate capacity of a thermionic tube. By this compensation I diminish or completely eliminate the disturbing effects which commonly arise from the fact that variations in potential across the plate circuit impedance affect the input circuit of the tube through its grid-plate capacity.

In carrying my invention into effect I arrange the impedance network of an amplifying stage to form a Wheatstone bridge circuit in which the input circuit and output circuit of the stage form conjugate arms of the bridge, as defined in my above mentioned application. In particular, I form a bridge in which there are at least two capacitive arms. I use the grid-plate capacity of the tube as one of these capacitive arms and I use for the other capacitive arm a capacity between the grid and cathode of the tube. This latter capacity may be the inherent grid-cathode capacity of the tube or it may be this tube capacity in parallel with an external capacity. By inherent grid-cathode capacity of the tube, I means the capacity between the grid and the filament elements within the bulb, and the distributed capacity which is inherent to the terminals and leads. By grid-cathode capacity I mean the total capacity between the grid and cathode of the tube including the inherent capacity and any additional or external capacity which may be connected in parallel therewith.

Referring now to the drawings, Fig. 1 is a circuit diagram of a thermionic amplifier tube connected according to my invention to prevent the flow of retroactive currents. Fig. 2 is a bridge diagram showing an equivalent arrangement of alternating current impedances. Figs. 3, 4 and 5 are alternative connections showing thermionic amplifiers in which the flow of retroactive current is compensated according to my invention. Fig. 6 is a circuit diagram of a two-stage amplifier balanced according to my invention, and working into a detector tube. In all figures the source of current for heating the cathodes and by-pass condensers have been omitted.

While all of these circuits embody my invention I shall describe in detail its operation with particular reference to Fig. 1.

In Fig. 1 the inherent grid-plate capacity of the tube is represented at $C_m$ by the dotted lines. The balancing capacity $C_c$ is shown in the most general case, $C_1$ being an external capacity and $C_g$, represented by dotted lines, being the inherent grid-cathode capacity of the tube. These capacities are connected in parallel and it is obvious that $C_c = C_1 + C_g$. The capacities $C_m$ and $C_c$ form the two capacitive arms of the bridge. The input circuit of the tube is coupled by means of the coil $L_2$ to the plate coil $L_3$, the mutual inductance between these coils being $M_{23}$. The degree of coupling between $L_2$ and $L_3$ may be varied within wide limits and it is obvious that the effect of giving coil $L_2$ very close coupling, say unity, with the lower portion of $L_3$ is the same as giving it loose coupling with all of $L_3$.

In order to obtain a physical picture of the operation of the circuit, we may consider the coil $L_3$ to be electrically divided into two parts $L_a$ and $L_b$ which parts are defined by some point, X. X is that intermediate point in coil $L_3$ of which the alternating current potential is the same as that maintained at point 2, i. e., the lower terminal of the input circuit, by the voltage induced in $L_2$ through the mutual inductance $M_{23}$. It can be shown that the pair of points G and 2 constitute terminals of one conjugate arm of an alternating current Wheatstone bridge in which the coil $L_3$ shunted by the internal plate-cathode impedance of the tube constitutes the second conjugate arm. The points G and 2 are the input terminals of the amplifying stage and by means of this Wheatstone bridge circuit they are so isolated from the plate circuit, forming the other conjugate arm of the bridge, that potential variations across the plate circuit impedance do not affect the input terminals of the amplifying stage. This effect is what I term compensation and it may be obtained by the proper proportioning of the inductance $L_3$, the mutual inductance $M_{23}$ and the capacity $C_c$. If these quantities are so chosen that an exact balance is obtained, the effect of retroactive currents flowing through the grid-plate capacity is completely eliminated. My invention, however, extends to partial elimination or mere limitation of this retroaction by means of an imperfect balance.

The manner in which my compensation is produced will be clear from the consideration of the following equations:—

Let $e_p$ represent the alternating voltage across the plate coil $L_3$ of the output circuit, the reaction from which upon the input circuit is to be compensated. Let $e_m$ represent the alternating voltage drop across $C_m$, $e_c$ the voltage across $C_c$, $e_2$ the voltage induced in coil $L_2$ through the mutual inductance $M_{23}$. At a given instant consider these voltages as positive in the sense of the arrows on Fig. 1. The resistance of coils $L_2$ and $L_3$ is negligible in comparison with their inductive reactances in all practical applications of my circuit. Moreover, the alternating current potential drop across the B battery may be neglected since it is common practice either to use a B battery having negligible alternating current resistance or to by-pass the B battery with a sufficiently large capacity. Assuming negligible grid current, the following relations between the several alternating current voltages, regardless of frequency, may be obtained for any instant of time from Kirchoff's circuital laws as applied to alternating currents.

$$e_2 = \frac{M_{23}}{L_3} e_p \quad (1)$$

$$e_c = e_m - e_p \quad (2)$$

$$e_m = -\frac{C_c}{C_m} e_c \quad (3)$$

Now the alternating voltage between points G and 2, which it is the purpose of this network to suppress is given by:

$$E_{2G} = e_2 + e_c \quad (4)$$

Substituting from Equations (1), (2) and (3) and equating the voltage $E_{2G}$ to zero, we have:

$$E_{2G} = e_P \left( \frac{M_{23}}{L_3} - \frac{1}{\frac{C_c}{C_m}} + 1 \right) = 0.$$

or $$\frac{L_3 - M_{23}}{M_{23}} = \frac{C_c}{C_m} \quad (5)$$

Equation (5) is thus the condition which must be satisfied for the suppression of retroactive effects of the plate circuit upon the input circuit terminals. It will be seen that this balance condition is independent of frequency for the reason that the arms $C_m$ and $C_c$ are each pure capacity and hence their ratio is invariant with frequency, and the ratio of the inductances may be maintained invariant with frequency since neither is shunted by an inherent tube capacity. Since the plate-cathode capacity of the tube is shunted across one of the conjugate arms and not across one of the four balancing arms of the bridge, independence of frequency may be secured, as is shown by the above equation and this ideal condition may be approximated in practice.

Fig. 2 is a diagrammatic representation of the alternating current bridge which exists in the circuit of Fig. 1. Here also $C_c = C_1 + C_g$, and as explained above the input terminals of the stage are points G and 2, while the output terminals are points P and F. Only the equivalent alternating current impedances are considered, and it will be seen that in virtue of the action of the mutual inductance $M_{23}$ in maintaining point 2 at the same alternating current potential as point X, the section $L_b$ of coil $L_3$ can be considered as one of the inductive arms of the bridge. It will be noticed that the sections $L_a$ and $L_b$ of coil $L_3$ do not enter explicitly into the conditions for balance; they are merely defined as being divided by an imaginary point X. X is employed in order to make clear the nature of my bridge and to allow of its representation in a conventional diagram. The point X has of course no physical existence, but is an imaginary mathematical division point in the coil $L_3$. It is obvious that this alternating current bridge diagram omits various direct current portions of the circuit as shown in Fig. 1, which portions do not enter into the condition for alternating current balance.

Fig. 3 shows another embodiment of my invention in which the lower side of the input circuit is tapped directly into the plate circuit inductance. The effect of this is obviously the same as if the coil $L_2$ in Fig. 1 were equal to and had unity coupling with the portion $L_b$ of the coil $L_3$. The condition for balance in this arrangement is $$C_c = \frac{L_a}{L_b} C_m.$$

Fig. 4 is a further embodiment of my invention. The resistances $R_a$, $R_b$ form the portion of the balancing network which is included in the plate circuit. The balance condition is $$C_c = \frac{R_a}{R_b} C_m.$$

Fig. 5 is still another embodiment of my invention wherein capacities $C_a$ and $C_b$ form the two arms of the bridge which are included in the plate circuit. The B battery potential is impressed upon the plate through a coil L which may serve as a means for coupling to the next stage. In standard practice the alternating current resistance of the B battery is negligible and the low side of $C_b$ may be connected at either side of the B battery. In this case the condition for balance is $$C_c = \frac{C_b}{C_a} C_m.$$

It is of course clear that any of these circuits embodying my invention may be connected to form a cascaded amplifier. Such an amplifier would have resistance, capacity, inductance, or inductive coupling as may be desired, the type of coupling used being independent of nature of the balancing impedance. Fig. 6 is a circuit diagram of a cascaded amplifier employing radio frequency stages I and II, each balanced according to my invention and working into a detector III. Any number of radio frequency stages might be cascaded in this way, and although I have shown tuned circuits between tubes it should be understood that this is not an essential part of my invention. In this figure as in Fig. 1 an external balancing capacity represented by $C_1$ is shown for the sake of generality. If such an external capacity is used it may be variable and the effective balancing capacity is of course the sum of $C_1$ and $C_g$. It would of course be possible to obtain a balance by means of the internal capacity alone, and this statement should be taken as applying to any of my circuits.

It has already been stated that I may obtain my balance by the inherent grid-cathode capacity alone, or by this capacity in parallel with an external one. If I use an external capacity I may adjust its value either by an exterior control or by a manufacturer's adjustment. The range of frequencies which may be compensated by a single adjustment is so great that in practice I prefer to use the manufacturer's adjustment.

As already stated, my bridge circuit as shown in Fig. 1 contains a compensating capacity $C_c$, which may be either the inherent tube capacity or this inherent capacity plus an external one in parallel therewith, and the coupling coil $L_2$ whereby the lower side of the input circuit is coupled to the plate circuit inductance $L_3$, the mutual inductance being $M_{23}$. It should be distinctly understood that I may use any coefficient of coupling between these two coils and in practice I have built sets which operate successfully when the coefficient of coupling is of the order of .75 or less. There are however, certain advantages in making the coefficient of coupling between $L_2$ and the $L_b$ portion of $L_3$ equal to unity and such unity coupling is to be considered as falling within the scope of my invention. Moreover, it is to be understood that while in the drawings I have shown a fixed coupling between $L_2$ and $L_3$ and effect my compensation either by the inherent grid-cathode capacity of the tube or by this capacity in parallel with an external one, I may if I so desire, employ a fixed capacity which may be either the inherent capacity alone or in parallel with an external one, and effect my compensation by variation of the mutual inductance between $L_2$ and $L_3$.

It is not essential that the constants of the arms of the bridge be invariable since the desired balance may be maintained by keeping an invariable ratio of the values of any two arms of the bridge while simultaneously varying their absolute values.

The alternating current potentials of various points in an audion circuit are commonly measured with respect to that of the audion cathode, which is usually at the lowest alternating current potential in the circuit. By lower side or lower terminal as applied to any element of an audion circuit, I mean that side or terminal which has the lower alternating current potential, that is, the alternating current potential of which most closely approaches to that of the cathode.

I claim:

1. A thermionic amplifier stage comprising a vacuum tube, an input circuit and an output circuit, a capacity between grid and plate of said vacuum tube, capacity between grid and cathode of said vacuum tube, inductance in the plate circuit of said vacuum tube, a connection from one side of said input circuit to the control grid of said vacuum tube, and a connection from the other side of said input circuit to the cathode of said vacuum tube through an inductance having substantially unity coupling with a portion of said inductance in the plate circuit, whereby the impedance mesh of said amplifier stage is arranged in the form of an alternating current Wheatstone bridge, of which the input and output circuits of the stage form conjugate arms, of which two balancing arms comprise respectively said capacity between grid and plate of said vacuum tube and said capacity between grid and cathode of said vacuum tube, and of which the two remaining balancing arms comprise portions of said inductance in the plate circuit of said vacuum tube.

2. A thermionic amplifier stage comprising a vacuum tube, an input circuit and an output circuit, a capacity between grid and plate of said vacuum tube, capacity between grid and cathode of said vacuum tube, inductance in the plate circuit of said vacuum tube, a connection from one side of said input circuit to the control grid of said vacuum tube, and a connection from the other side of said input circuit to the cathode of said vacuum tube through an inductance magnetically coupled to said inductance in the plate circuit, whereby the impedance mesh of said amplifier stage is arranged in the form of an alternating current Wheatstone bridge, of which the input and output circuits of the stage form conjugate arms, of which two balancing arms comprise respectively said capacity between grid and plate of said vacuum tube and said capacity between grid and cathode of said vacuum tube, and of which the two remaining balancing arms comprise portions of said inductance in the plate circuit of said vacuum tube.

3. In an amplifier stage, the combination with a three-electrode audion, a capacity across the grid and plate terminals of said audion, an input circuit, and an output circuit, of an external capacity across the grid and cathode terminals of said audion, and an external inductive coupling between said circuits operative to establish compensative currents through the capacity across the grid and cathode terminals to oppose the effects of retroactive currents through said grid-plate capacity.

4. In an amplifier stage, the combination with a three-electrode audion, a source of direct current, and a plate impedance comprising a winding having its lower end connected to a cathode terminal of said tube through said direct current source and its upper end connected to the plate terminal of said tube, of a second winding wound in the same sense as and coupled to said plate impedance, the lower end of said second winding being connected to a cathode terminal and the upper end of said second winding serving as an input terminal for said amplifier stage, the grid terminal of said audion providing the other input terminal for said stage.

5. The method of preventing retroactive effects in an audion amplifier stage having an input circuit, an audion with grid, plate and cathode terminals, and an output circuit including an inductance between said plate and cathode terminals, which comprises coupling one terminal of the input circuit to said audion grid terminal and inductively coupling the second terminal of said input circuit to a point in said inductance at which the alternating current potential is intermediate the potentials of said plate and cathode terminals.

6. The method of preventing retroactive effects in an audion amplifier stage having an input circuit, an audion with grid, plate and cathode terminals, and a direct current output path including an inductance between said plate and cathode terminals, which comprises coupling one terminal of said input circuit to said audion grid terminal and inductively coupling the second terminal of said input circuit to a point in said inductance at which the alternating current potential is intermediate the potentials of said plate and cathode terminals.

7. A vacuum tube amplifier stage the impedance network of which is arranged in the form of an alternating current Wheatstone bridge of which capacities between grid and plate and between grid and cathode of the vacuum tube form, respectively, two balancing arms, and of which the two remaining balancing arms are constituted by a plate inductance connected between plate and cathode of the vacuum tube and a second inductance coupled thereto and wound in the same sense, one terminal of said second inductance being connected to the cathode of said vacuum tube and the other terminal of said second inductance serving as an input terminal for said amplifier stage, said grid electrode serving as the other input terminal thereof.

8. In an amplifier stage, the combination with a three-electrode audion, a plate impedance and a source of direct current connected in series therewith between the plate and cathode of said audion, said impedance providing means for coupling the succeeding input circuit to said stage, of an input circuit for said stage having one terminal connected to the grid terminal of said tube, and an impedance having a substantial alternating current reactance between the second terminal of the input circuit and the cathode terminal of said tube, said impedance being inductively coupled to said plate impedance.

9. An audion amplifier stage comprising an audion tube and an impedance mesh arranged in the form of an alternating current Wheatstone's bridge of which one arm is capacity between grid and plate of said audion tube, one arm comprises capacity between grid and cathode of said audion tube, and two arms are formed by a coil in the plate circuit of said audion tube, one side of the input circuit of said amplifier stage being connected to the grid of said audion tube, and the other side of said input circuit being connected to the cathode of said audion tube through a coil wound from the input circuit to the cathode in the same sense as the winding from plate to cathode of said plate circuit coil and having close coupling with a portion of said plate circuit coil.

10. An audion amplifier stage comprising an audion tube and an impedance mesh arranged in the form of an alternating current Wheatstone's bridge of which one arm is capacity between grid and plate of said audion tube, one arm comprises capacity between grid and cathode of said audion tube, and two arms are formed by a coil in the plate circuit of said audion tube, one side of the input circuit of said amplifier stage being connected to the grid of said audion tube and the other side of said input circuit being connected to the cathode of said audion tube through a coil having substantially unity coupling with a portion of said plate circuit coil.

11. An audion amplifier stage comprising an alternating current Wheatstone's bridge of which the input and output circuits of the amplifier stage form conjugate arms, and a coil in series with one terminal of the input circuit of said stage and the cathode having substantially unity coupling with a portion of the output circuit of said stage.

12. An audion amplifier stage comprising input and output circuits, an audion tube, a circuit connection from one terminal of said input circuit to the grid of said tube and a circuit connection from the other terminal of said input circuit to the audion cathode through an inductance having substantially unity coupling with an inductance in the output circuit.

13. An audion amplifier stage comprising an input circuit, an output circuit including an inductance coil, a second inductance coil wound in the same sense as the first inductance and coupled with substantially unity coupling to a portion of said first inductance, a circuit connection from one terminal of said input circuit to the grid of said audion tube and a circuit connection from the other terminal of said input circuit to the audion cathode through said second inductance.

In testimony whereof, I affix my signature.

STUART BALLANTINE.